United States Patent [19]

Rice

[11] Patent Number: 5,026,112
[45] Date of Patent: Jun. 25, 1991

[54] TRUCK TRAILER WITH REMOVABLE SIDE PANELS

[75] Inventor: Ronald K. Rice, Maud, Tex.

[73] Assignee: James S. Waldron, Washington, D.C.

[21] Appl. No.: 541,729

[22] Filed: Jun. 21, 1990

[51] Int. Cl.⁵ .............................................. B62D 27/00
[52] U.S. Cl. ...................................... 296/181; 296/183
[58] Field of Search .......................... 296/181, 182, 183

[56] References Cited

U.S. PATENT DOCUMENTS

| | | | |
|---|---|---|---|
| 2,974,996 | 3/1961 | Bitterman et al. | 296/181 |
| 3,155,419 | 11/1964 | Garson et al. | 296/181 |
| 3,252,730 | 5/1966 | Chieger et al. | 296/181 |
| 3,266,837 | 8/1966 | Stricker, Jr. | 296/181 |
| 4,408,793 | 10/1983 | Broadbent | 296/181 |
| 4,668,008 | 5/1987 | Stinson | 296/155 |

FOREIGN PATENT DOCUMENTS 3613284 10/1987 Fed. Rep. of Germany .

Primary Examiner—Robert R. Song
Attorney, Agent, or Firm—Waldron & Associates

[57] ABSTRACT

A dry van truck trailer or cargo area is provided with a plurality of removable side panels which can be removed by opening the rear door and sliding the panels outwardly from the rear of the truck trailer or cargo area when the rear door is in the open position to thereby permit side-loading or utilization of the floor as a flat-bed. When the side panels are in place, they seal against each other and against adjacent components to render the truck trailer or cargo area as a water tight dry van.

17 Claims, 3 Drawing Sheets

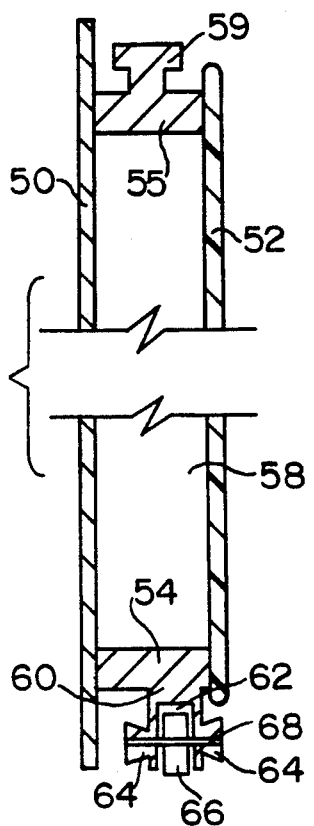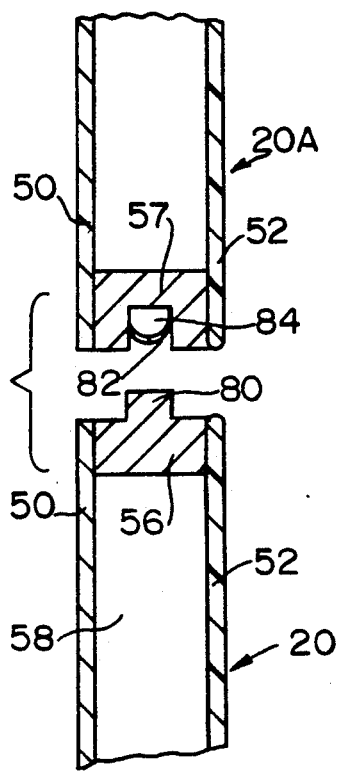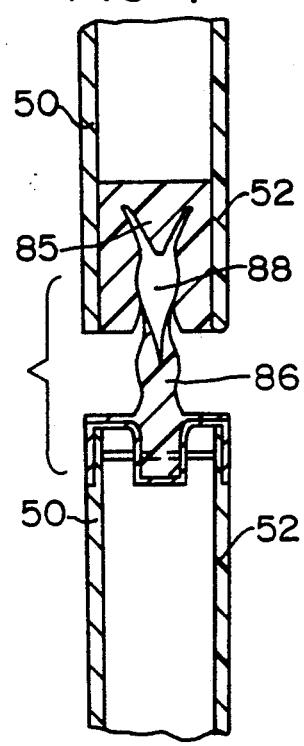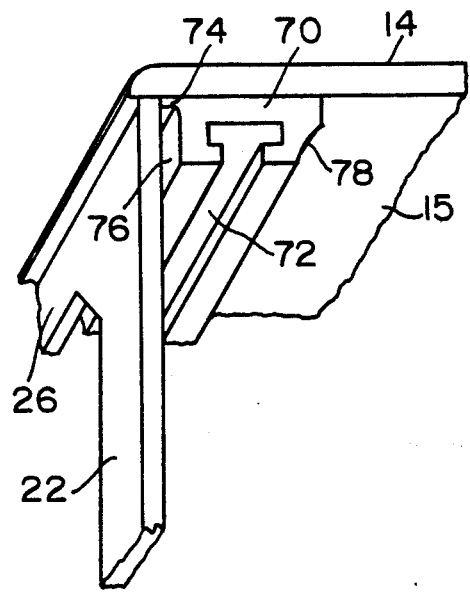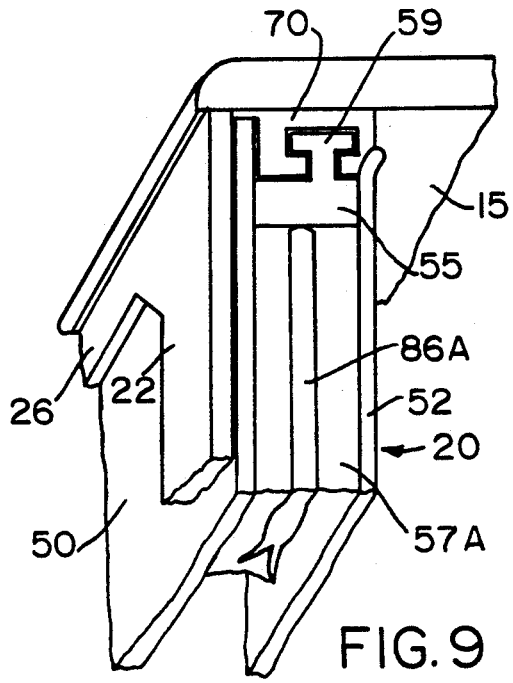

FIG. 1
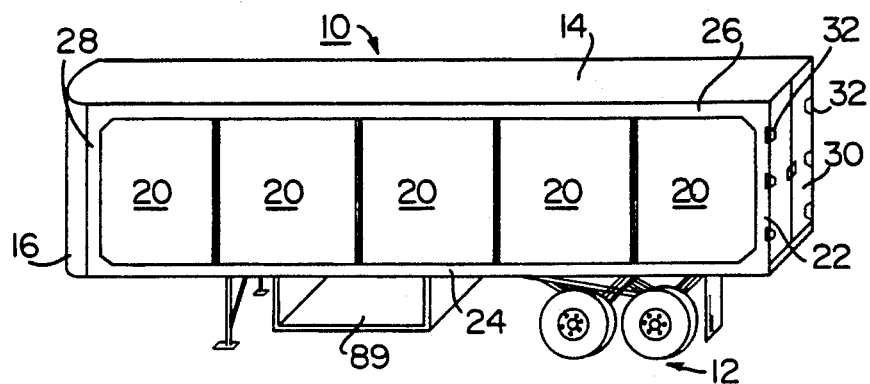
FIG. 2
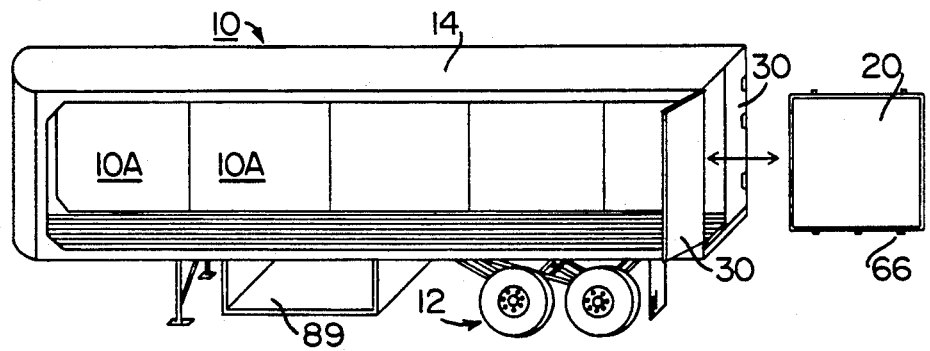
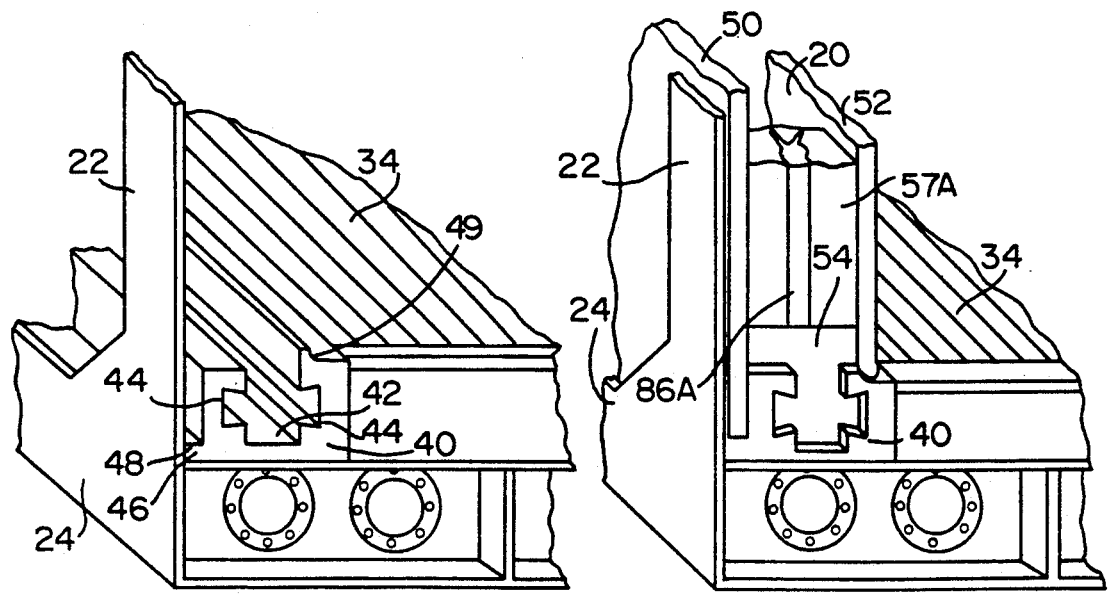
FIG. 3
FIG. 4

TRUCK TRAILER WITH REMOVABLE SIDE PANELS

BACKGROUND OF THE INVENTION

1. Field of the Invention

This invention relates generally to vehicular trucks, and more particularly to semi-truck trailers, or truck cargo areas of one piece trucks, having removable side panels which will provide a completely enclosed cargo area so that the truck can be used as a dry van, and yet permit unrestricted side loading thereof and even limited use of the trailer or cargo area as a flat bed.

2. The Prior Art

There are several different forms of truck trailers and truck beds which have differing designs primarily for purposes of carrying loads of different loading and/or hauling requirements. Perhaps the simplest type of truck trailer or cargo area is the flat bed, which merely provides a floor area with no roof or side walls. Flat bed trucks and trailers are primarily used to haul sizable loads which will not be effected by adverse weather conditions, particularly loads that can be more easily loaded with a crane or fork lift truck, such as large pieces of machinery, logs, steel mill products like steel coils, steel plates, steel beams etc., and other comparable loads. The nature of such loads usually require that they be tied down to the flat bed floor with cables or chains.

There are many loads, however, which require the use of dry vans, i.e. closed truck trailers or cargo areas for the purposes of protecting the cargo from adverse weather conditions which may even include refrigeration of perishable goods. Dry vans are perhaps the most common of all truck trailers and cargo areas, and are used to haul all kinds of goods such as home furnishings, clothing, food products and many other products that are not suitable for loading on a flat bed truck. Even products that may not be adversely affected by varying weather conditions may be small enough that they must be hauled in dry vans for purposes of keeping the cargo within a lockable confinement for safe keeping, or simply to confine the cargo to a closure so that it does not need to be tied down or otherwise confined to keep it from falling from the truck bed.

Dry vans are typically provided with doors at the rear end of the trailer or cargo area through which the dry van is loaded and unloaded, which is quite satisfactory for loading and unloading at a conventional loading dock. There are loads, however, which are not particularly amenable to loading through a rear door, particularly elongated loads such as for example, bundles of elongated plastic pipes, finished lumber and the like, which must be loaded either with a crane or side loaded with a fork-lift truck. Accordingly, such loads must normally be hauled on flat bed trucks merely by virtue of the fact that they cannot be readily loaded into a dry van.

While some truck trailers, particularly moving vans, are provided with side doors, the side doors provide a rather limited access opening, being limited to a midsection on one side of the trailer. Since such side doors are designed primarily for personal access so that the deep end of the trailer can be manually loaded and unloaded without the need of unloading any cargo which may be blocking access through the rear doors of the trailer, the side doors still do not readily permit side loading of the trailer with a fork-lift truck.

Because truck trailers cannot often be used to haul loads of differing hauling or loading requirements, commercial trucks must usually be dedicated to use for hauling only certain limited types of goods. This often results in the fact that a given truck may be driven many miles to deliver a particular load of goods, and then necessarily returned empty because of the inability for that particular truck to accept loads of differing hauling or loading requirements going in the return direction.

The above limited usefulness of trucks, and particularly semi-truck trailers, has been recognized. Indeed, some flat bed truck and trailers are equipped with insertable side panels over which a tarpaulin can be tied. While such a trailer can be utilized as a flat bed and yet provide some form of limited protection of the load from adverse weather conditions, such trailers are clearly not dry vans as rain and winds can still gain access to, and damage the load. As another example, U.S. Pat. No. 4,640,544 discloses a semi-truck trailer having side walls formed by plurality of hinged side-panels over which a tarpaulin can be tied. The side panels are hinged together so that each entire side wall can be folded into the front portion of the trailer, thereby permitting use of the trailer as a flat bed. Such a trailer, however, is not truly wind and water tight, and cannot therefore be utilized as a dry van. In addition, once the side walls are folded into the forward end of the trailer and the load placed on the trailer bed, the walls cannot be repositioned around the load.

SUMMARY OF THE INVENTION

This invention is predicated upon the conception and development of a semi-truck trailer, or cargo area for a one piece truck, having removable side panels which are not only removable for the purpose of permitting the trailer to be side loaded and/or used as a flat bed trailer, but which side panels will tightly seal against one another and against a permanent roof member so that the trailer can be utilized as a dry van. The truck or trailer is provided with rear doors so that it can exclusively be utilized as a dry van and loaded through the rear doors when so desired without removing the side panels. In the alternative, the side panels can be removed so that the truck or trailer can be side-loaded with a fork-lift truck or otherwise, and then the panels reinserted so that the load can be hauled in a dry van, or optionally, the side panels left in a storage rack and the load hauled on a flat bed. The removable side panels of the truck or trailer of this invention provide a sufficiently good seal that the truck or trailer can even be provided with refrigeration equipment permitting its use as a refrigerator van.

While this invention is equally applicable to semi-truck trailers and to one piece truck bodies, having the load carrying cargo area and truck cab on the same frame, for convenience purposes, the following detailed description of the invention will be limited to descriptions of semi-truck trailers, with the understanding that the same principles can be utilized in conjunction with a load carrying cargo area on a one-piece truck.

BRIEF DESCRIPTION OF THE DRAWINGS

FIG. 1 is an isometric view of a semi-truck trailer according to one embodiment of this invention.

FIG. 2 is identical to FIG. 1 except that it illustrates the trailer having all side panels removed from the left side thereof.

FIG. 3 is a partial isometric view of the lower rear portion of the semi-truck trailer shown in FIGS. 1 and 2 with the rear door removed to show a portion of the trailer floor and the left floor track with at least the rear-most side wall removed therefrom.

FIG. 4 is identical to FIG. 3 except that it illustrates a portion of the rear-most side wall in place within the left floor track.

FIG. 5 is a segmented vertical cross-section through a removable side panel particularly illustrating the cross-section of the lower and upper frame member for engaging the floor and ceiling tracks respectively.

FIG. 6 is a partial horizontal cross-section through a pair of adjoining side wall members showing the two members spaced a few inches apart from a completely engaging position to illustrate a tongue-in-groove sealing engagement.

FIG. 7 is the same as FIG. 6 except that it illustrates a modified tongue in grove sealing arrangement.

FIG. 8 is a partial isometric view of the left side, upper rear portion of the trailer shown in FIGS. 1 and 2 with the rear door removed to particularly illustrate the end of the left ceiling track and its cross-section.

FIG. 9 is identical to FIG. 8 except that it illustrates a portion of the rear-most side wall in place within the left ceiling track.

DETAILED DESCRIPTION OF THE INVENTION

Figure 10:
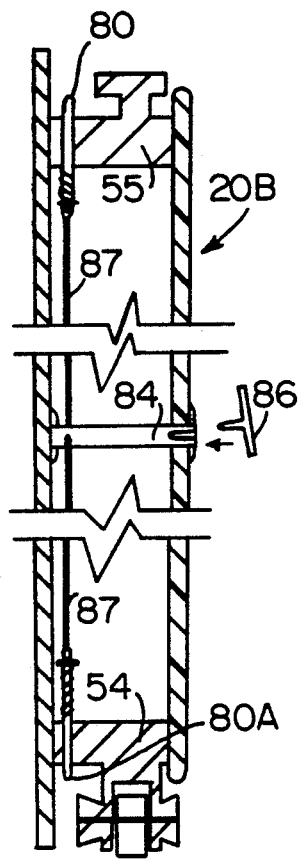
FIG. 10 is a segmented vertical cross-section through a removable side panel particularly illustrating a locking means for locking the side panel in place.

Reference to FIG. 1 will illustrate a semi-truck trailer 10 according to one embodiment of this invention having tandem rear wheels 12 supporting the rearward end of trailer 10. A roof 14 is permanently supported by the fixed and permanent forward wall 16 and rearward vertical support frames 22, and semi-permanently supported by five removable side panels 20, which form the left wall of trailer 10, as well as an equal number of side wall panels 20 forming the right wall (FIG. 2). The rearward vertical support frame 22 are portions of an open side frame which defines the periphery of the trailer side wall, and which consist of a lower horizontal support frame 24, an upper horizontal support frame 26, a forward vertical support frame 28, and the above mentioned rearward vertical support frame 22.

Hinges 32, secured to rearward vertical support frames 22, hingedly support rear doors 30 such that one door each is supported by each of said two rearward vertical support frames 22. As is apparent from FIGS. 1 and 2, each side of trailer 10 as shown is provided with five side panels 20, all of which are removable as can be seen by contrasting FIGS. 1 and 2. Although five panels 20 are shown on each side of trailer 10, it should be apparent that any number of panels 20 can be provided depending upon the length of trailer 10 and the preferred width of each panel 20. It should also be apparent that while only the left side of trailer 10 is shown to have side panels 20 removed, that removable side panels can be provided on either one or both sides of the trailer 10.

Reference to FIGS. 3 and 4 will illustrate the left, rear portion of floor 34 of trailer 10 showing the rearward end of floor track 40 into which the lower portion of side panels 20 are engagable. As illustrated in both FIGS. 3 and 4, the left rear door 30 is not shown so that the trailer floor 34 can be seen, wherein FIG. 3 illustrates the view with the visible side panels 20 removed for side loading, and FIG. 4 illustrates the same view with the side panels 20 in place to form a side-wall to render the trailer 10 as a dry van. The cross-section of track 40 is clearly visible from the rearward view as illustrated in FIGS. 3 and 4. Specifically, floor track 40 is an elongated body which forms the outer left-side edge of the trailer floor and is made of a hard durable material such as cast or drawn metal, hard plastic or the like. Floor track 40 has a deep wheel channel 42 therein extending vertically downward from the upper surface, and two dove-tail channels 44 extending horizontally from the approximate mid-point of wheel channel 42. An outwardly extending flange 46 is also provided adjacent to the base so that a gap 48 is formed above flange 46 between the outside edge of floor track 40 and the rearward vertical support frame 22 and lower horizontal support frame 24. A lip 48, having an angled or curved inside surface, is provided on the inside upper corner of floor track 40. This cross-section of floor track 40 is uniform throughout its length which extends from its most rearward point just inside left rear door 30 to the outer edge of forward wall 16, behind forward vertical support frames 28. While FIGS. 3 and 4 do not show the left door 30, which is hingedly secured to rearward vertical support frame 22, for purposes of simplifying the illustration, the left door 30 should be such that the end of floor track 40 is fully exposed as shown when the door is in the open position, and such that the rearward end of the rear-most side panel 20, as well as floor track 40, are completely covered by the door when the door is in the closed position.

Reference to FIG. 5 and 6 will show that each side panel 20 is of rectangular form and consists of a rectangular outside wall board 50 and a rectangular inside wall board 52 each of which are secured to a rectangular frame member comprising a floor guide 54, a ceiling guide 55 a forward edge member 56 and a rearward edge member 57. The three-dimensional rectangular space 58 within each side panel 20 may be hollow, or if desired, filled with an insulative material (not shown). The outside wall board 50 may be formed of any rigid material such as plywood, plastic, or the like, or an aluminum or other metallic sheeting over plywood, plastic or the like which may be better suited for painting. While practically any kind of wall board material can be utilized as inside wall board 52, a properly selected material is important for purposes of protecting the side wall 20 as well as the floor and ceiling tracks 40 and 70, and the floor and ceiling guides 54 and 55. That is to say, fork-lift trucks will often be utilized inside the trailer for loading and unloading, and it is well known that the fork-lift trucks will bang into the interior trailer walls from time to time. For this reason, most prior art truck trailers are already provided with a special corrugated sheet steel inside wall boards or liners which provides considerable resistance to damage. Accordingly, such prior art wall boards are preferred for the trailer of this invention. However, by virtue of the fact that the side panels of the truck trailer of this invention are removable, it is exceptionally important that precautions be taken to prevent damage, particularly at interfaces where the side panels 20 must be properly fitted together, and at the side panel-track interfaces where the side panels must be free to easily slide or roll when they are to be removed and reinserted. Therefore, inside wall board 52 and its abutment against floor track 40 and ceiling track 70, should be designed to assure minimum damage to the track and guide alignment, and interfaces which would render them inoperable. A reinforcing abutment will be discussed below.

As can be seen by comparing FIG. 5 to FIGS. 3 and 4, floor guide 54 is provided with a lower cross-section that will mate generally with deep wheel channel 42 and the two dove-tail channels 44 in floor track 40. Specifically, floor guide 54 comprises an elongated rectangular body to which outside and inside wall boards 50 and 52 are secured at the outer peripheral surfaces. These may be secured by any suitable means such as screws, rivets, adhesive or the like (not shown), and should preferably be so securely fastened together that the side panel 20 is air tight. The exposed lower end of floor guide 54 is provided with a downwardly extending flange 60 which is provided with a channel 62 in the bottom thereof and a dove-tail flange 64 on each side of flange 60. Small wheels 66 are recessed within channel 62 which are rotatably mounted onto axle pins 68 extending through the mid-points of dove-tail flanges 64. Normally, two or three wheels 66 per side wall panel 20 will be sufficient. Accordingly, when a side wall panel 20 is to be inserted or removed, wheels 66, rolling on the lower surface of wheel channel 42, with dove tail flanges 64, fitted within dove-tail channels 44, will permit easy sliding of the side panels 20 along the floor track 40.

Reference to FIG. 8 will illustrate the left, upper portion of trailer 10 showing the rearward end of ceiling track 70 into which the ceiling guide 55 of side panels 20 are engagable. As illustrated, ceiling track 70 comprises an elongated body quite similar to floor track 40, having a cross-section that is readily visible from FIG. 8. Specifically, ceiling track 70 is an elongated body suspended along the outer left edge of the trailer ceiling 15, and is made of a hard durable material such as cast or drawn metal, hard plastic or the like. A "T" channel 72 extends upwardly through the lower surface, while an outwardly extending flange 74 is provided along the upper outside edge so that a gap 76 is formed below flange 74 between the ceiling track 70 and the rearward vertical support frame 22 and the upper horizontal support frame 26. The upper inside edge of ceiling track 70 is provided with a sloped or curved surface 78. This cross-section of ceiling track 70 is uniform throughout its length which extends from its most rearward point just inside left rear door 30 to the outer edge of forward wall 16, behind forward vertical support frame 28. As should be obvious, ceiling track 70 should be positioned directly over, and parallel to, floor track 40.

As can be seen by comparing FIG. 5 to FIG. 8, ceiling guide 55 on side panel 26 is provided with an upper cross-section that will mate generally with "T" channel 72. Specifically, ceiling guide 55 comprises an elongated rectangular body to which outside and inside wall boards 50 and 52 are secured at the outer peripheral surfaces, as previously described in connection with the attachment of the wall boards 50 and 52 to the floor guide 54. The exposed upper edge of ceiling guide 55 is provided with an upwardly extending "T" flange 59 of such position and cross-section that it will slide into "T" channel 72 in ceiling track 70 when the floor guide 54 is inserted into and mating with floor track 40. Accordingly, when a side wall panel 20 is to be inserted, the panel must be placed in an upright position and floor guide 54 mated with floor track 40 at the same time that "T" flange is inserted within "T" channel 72. Then, with wheels 66 rolling on the lower surface of wheel channel 42, with dove tail flanges 64, fitted within dovetail channels 44, the panel can easily be rolled into its proper position. Obviously, "T" channel 72 and wheel channels 42, as well as dove tail channels 44 in floor track 40 must be open at the rear of the trailer to permit removal and insertion of panels 20. Reference to FIG. 9 will illustrate the same view as described with reference to FIG. 8 with the exception that the rear-most side panel 20 is in place, with ceiling guide 55 properly engaged within ceiling track 70. While FIGS. 8 and 9 do not show the left door 30, which is hingedly secured to rearward vertical support frame 22, for purposes of simplifying the illustration, the left door 30 should be such that the end of ceiling track 70 is fully exposed as shown when the door is in the open position, so that the rearward end of the rear-most side panel 20 as well as ceiling track 70 are completely covered by the door when it is in the closed position.

In addition to guides 54 and 55 engaging directly into floor and ceiling tracks 40 and 70 as described above, it can be further seen that the lower edge of outside wall board 50 will be guided into gap 48 adjacent to floor track 40, while the upper edge thereof will be guided into gap 76 adjacent to ceiling track 70. In this way, the outside wall board 50 will be positioned just inside the open side frame, which as noted above, is made up of the forward and rearward vertical support frames 28 and 22 respectively, and the lower and upper horizontal support frames 24 and 26 respectively. With the plurality of side panels 20 properly in place abutting against each other, as will be described below, the abutting outside wall boards 50 will provide a water tight seal along the outer sides of the trailer 10. While water may be able to gain entry between the outside wall board 50 and the open side frame, and particularly the lower horizontal support frame 24, the water will not be able to pass upward over floor track 40. For obvious reasons, therefore, drain holes (not shown) should be provided at the base of gap 42 to permit the escape of water that may pass between outside wall board 50 and lower horizontal support frame 24. Any water that may enter between the vertical support frames 22 and 28 and outside wall board 50, will, of course, move downwardly by force of gravity and drain through the above mentioned drain holes, provided, of course, that the forward-most side panel 20 is properly sealed against forward wall 16, and that the rearward most side panel 20 is properly sealed against rear door 30.

As an alternative to the above described design for ceiling track 70 and ceiling guide 55, these two components can be identical to the floor track and floor guide 20 and 54 respectively, even to the point of including wheels 66 within ceiling guide 55. One advantage to be gained by this approach, is that the side panels will be identical at top and bottom, and can therefore be interchanged from left side to right side or visa versa by merely turning them upside down to make a change from one side to the other. Another advantage to be gained is that the manufacture of the side panels will be simplified and less costly if the floor and ceiling guides are identical and there is no distinction between right and left side panels.

On the inside of trailer 10, it has already been noted that the inside wall board 52 is preferably made of a material that will help to dampen any damaging effect that may result from fork-lift trucks banging into the inside wall boards 52. One such approach is to utilize corrugated sheet steel material as is conventionally used in truck trailers, which can be dented and even punctured without seriously effecting the integrity of the side panel. To help further minimize damage to the side panels, the inside wall board 52 should be supported at the upper and lower edges against floor track 40 and ceiling track 70, such as shown in FIGS. 4 and 9. Therefore, any forceful impact against the wall board 52 will be resisted by the side surfaces of the floor and ceiling tracks 40 and 70 respectively, without causing any likely damage to the engaging surfaces between the tracks and guides 54 and 55, or the engaging surfaces of edge members 56 and 57, which could prevent proper functioning of the removable side panels 20. As another alternative, wall boards 52 can be made of a stiff, pliable material such as stiff rubber matting. With this embodiment, any forceful impact against the rubber wall board 52 will be absorbed by the elastic deflection of the rubber so as to minimize any likely damage to the engaging surfaces between the tracks and guides 54 and 55 and edge members 56 and 57. The use of a rubber wall board 52 can provide the additional advantage of providing an inside seal along the upper and lower edges of side panels 20. In the embodiment shown in FIG. 4, the lower edge of a rubber wall board 52 is sized so that a small portion will extend downward from the edge of floor guide 54 to which it is attached, so that the extended portion thereof will be slightly deflected to be biased against lip 48 on floor track 40 to thereby provide a reasonably air tight seal along the intersection between the floor 34 and the side panel 20. In a like manner, the upper edge of inside wall board 52 extends moderately above the edge of ceiling guide 55 so that the extended portion will be slightly deflected to provide an air tight seal against the tapered edge surface 76 on ceiling track 70. It should be appreciated that such an air tight sealing arrangement could be effected in various different forms which could include other biasing structures against the tracks 40 and 70, the floor 34, or even the outside frame structures 22, 24, 26 and 28. While such a sealing arrangement is certainly beneficial, particularly if the dry van is to be utilized as a refrigeration trailer, it is not an essential feature of this invention.

Reference to FIGS. 6 and 7 will illustrate two different embodiments for sealing the panels 20 against each other. FIG. 6 illustrates the forward edge member 56 on one side panel 20 displaced by a short distance from the adjoining rearward edge member 57 of the adjacent side panel 20A. As can be seen in FIG. 6, the forward edge member 56 is provided with a protruding "tongue" extension 80, while the rearward edge member 57 is provided with a mating "groove" 82, to provide a "tongue-in-groove" type of engagement. A compressible sealing material, such as a strip of foam rubber or rubber tubing 84, is provided at the base of groove 82, so that when the two side panels are fitted tightly together, tongue 80 will compress foam rubber or rubber tubing strip 84 so that the interface between the adjoining side panels will be air and water tight.

FIG. 7 illustrates another modified "tongue-in-grove" arrangement, where a forked rubber tongue 86 is insertable into a mating "groove", i.e. forked groove 88. In this embodiment, the spacer 85 between the two forked grooves will be forced between the two forked tongues 86 causing the "bulb" at the base of the two tongues 86 to swell thereby tightly fitting within the "bulb" portion of the groove. Obviously, it is immaterial whether the tongue or groove is positioned on the forward or rearward edge members 56 and 57 as the reverse arrangement will work equally well. It should also be apparent that the forward wall 16 should also be provided with a tongue or groove as necessary to seal the forward edge of the forward-most side panel 20, or any other comparable sealing arrangement. In a like manner, the rear door 30 should be made to seal against the back side of the most rearward side panel 20 as well as the roof 14 and floor 34, which may be pursuant to conventional techniques. Any of those techniques currently in use for sealing trailer doors to the body of the trailer should be satisfactory for the trailer of this invention, provided any such sealing means will permit removal of the side panels 20. However, since it is preferred that all the side panels 20 be identical, an ideal sealing technique at the rear doors is to provide the rearmost side panel with a groove 84 or 88 as are the rest of the side panels. Then a partial rubber tongue member can be inserted therein which protrudes slightly from rearward edge member 57, against which the rear doors 30 will seal. Reference to FIGS. 4 and 9 will illustrate such a partial tongue member 86A, which is substantially like tongues 86, except that there is no means thereon for attaching it permanently to a forward edge member 56, but rather provides a rounded extension beyond the surface of rearward edge member 57 against which the rear doors 30 can seal. This partial tongue member 86A can be left in place when the rearmost side panel 20 is removed from the trailer, or can be removed from the side panel if that side panel is to be used at any location other than the rearmost side panel. By using this technique, all side panels 20 will be identical to each other and completely interchangeable, provided, of course, that the floor and ceiling guides 20 and 54 respectively, are identical, as discussed above.

When all of the side panels 20 are inserted, and fully occupy the space allowed for them within floor and ceiling tracks 40 and 70, and door 30 closed against the rear-most panel, the aligned panels should be tightly abutting against each other to form a rigid solid wall which is reasonably air and water tight, i.e. water tight and air tight to the extent that drafts are reasonably eliminated, and to the extent that any prior art dry van is air and water tight. An ideal arrangement should preferably be that door 30 will not close properly unless all the side panels 20 are fully inserted as essential to form tight seals at all interfaces.

While the closing and locking of door 30 should be sufficient to maintain the aligned panels 20 in place, as an optional feature, it may be desirable to provide a means for locking any one or more of the individual side panels 20 in place, particularly the rear-most side panel. FIG. 10 is a segmented vertical cross-sectional side view of a side panel 20B having such a locking means, wherein side panel 20B is provided with a spring loaded latch pin 80 at some location along inside surface of ceiling guide 55, and a matching spring loaded latch pin 80A on the inside surface of floor guide 54. Each latch pin 80 and 80A is secured to the respective guide 55 and 54 respectively such that the latch pin 80 and 80A is spring biased to extend through an opening in the guide 55 and 54 as shown, and further adapted to be insertable into a mating hole (not shown) in each of the ceiling and floor tracks 70 and 40 respectively. A rotatable shaft 84, extending transversely through inside wall board 52 and having a handle, or preferably a removable key 86 securable thereto, and accessible from the inside of trailer 10, has a pull cable 87 secured thereto such that a partial rotation of handle or key 86 will cause a partial winding of cable 87 around shaft 84, so that the cable ends will withdraw latch pins 80 and 80A sufficiently to disengage them from the holes in ceiling and floor tracks 70 and 40, to thereby permit the side panel 20B to be moved as desired. As should be apparent a great variety of differing locking means could be provided if desired.

Reference to FIG. 1 and 2 will illustrate a storage rack 89 on the under surface of trailer 10, which can be utilized for the purpose of storing side panels 20, particularly when the trailer is being utilized as a flat bed. That is to say, if it becomes necessary to utilize the trailer 10 as a flat bed so that the cargo must be hauled without replacing the side panels 20, it will be essential that the side panels be taken along with the trailer so that they can be used subsequently when it is necessary to do so. While practically any type of storage rack 89 can be utilized for this purpose, it is preferable that the storage rack be one that is not a hindrance during periods of non-use. To this end, a storage rack in the forward area of the trailer could be devised, holding the side panels 20 in an upright position. Accordingly, a suitable rack for holding the panels 20 could take several different forms, and the design thereof is readily within the skill of the art. Therefore, a detailed description of such a rack is not essential here.

Figure 11:
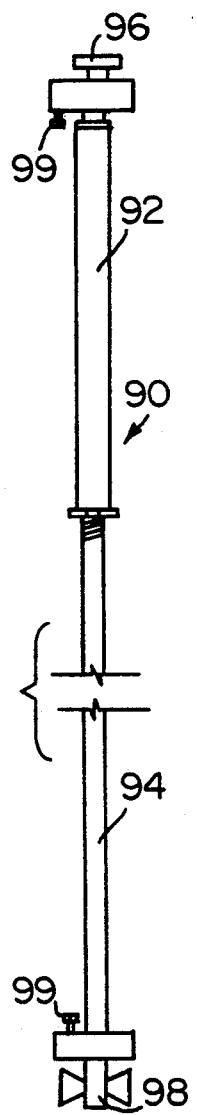
FIG. 11 illustrates an elevation of a roof support post.

Another feature that could at times be particularly helpful, if not essential, is a roof support post, for the purpose of adding support to the roof in the event the trailer must be utilized as a flat bed, i.e. if a load must be hauled without replacing any of the side panels on one or both sides of the trailer. Reference to FIG. 11 will illustrate an example of such a support post 90, which in essence comprises an elongated screw jack, having a tubular member 92 threaded onto a solid rod 94, such that the turning of the tubular member 92 with respect to rod 94, will render the support post to be of adjustable length. The upper end of support post 90 is provided with a plate member 96, having a vertical cross-section permitting it to be engaged with ceiling track 70, while the lower end is provided with a plate member 98 having a cross section permitting it to be engaged with floor track 40. Means should be provided, such as bolts 99, for locking each plate member 96 and 98 in place within the floor and ceiling tracks 40 and 70. Accordingly, in the event it becomes necessary to haul a load without replacing the side panels 20, one or more support posts 90 can be positioned where desired to extend between the floor and ceiling tracks 40 and 70, twisted to adjust it to the proper height, and then locked in place by tightening bolts 99.

Figure 12:
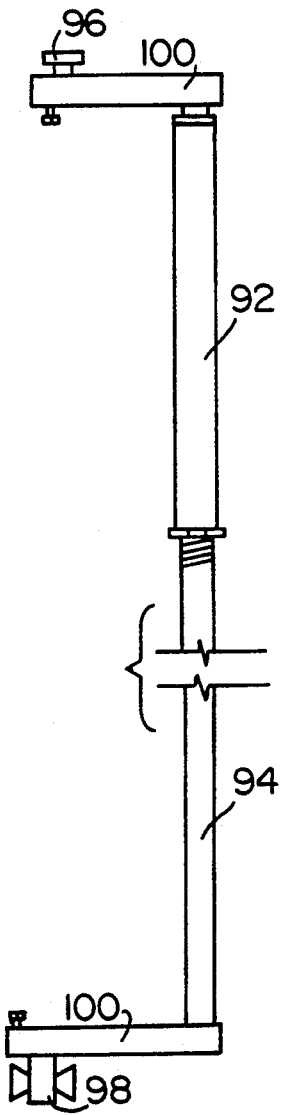
FIG. 12 illustrates an elevation of another embodiment of a roof support.

As an alternative to the above described support post, the two extreme ends of the support post 90 can be provided with offsetting arm members 100, as shown in FIG. 12, in the event the load on the trailer floor is too wide to permit the support post to be positioned directly over floor track 40. It should be readily apparently that the design for the support post could take a variety of forms which are readily within the skill of the art to design, and therefore need not be further detailed here.

In view of the above described embodiment of this inventive truck trailer, it should be readily apparent that a great number of other embodiments and modifications could be made without departing from the spirit of the invention. For example, it has already been noted that the inventive removable side panels could be incorporated into a one piece truck if so desired. It should be further readily apparent that while a detailed description of the side panels 20 and the floor and ceiling tracks 40 and 70 have been shown by way of example, that a great number of other designs could be utilized as well. For example, the cross-sectional configuration of the floor and ceiling tracks could be identical if so desired, or could be modified considerably to take on a variety of cross-sectional forms. While the side panels 20 could even consist of rectangular top and bottom edges adapted to slide into box channels, some sort of a "T" or dove tail cross-section is preferred so that the side panels will fully engaged at both the floor and ceiling should the trailer floor want to flex when a loaded trailer is subjected to rough road conditions. If each individual side panel 20 were light enough in weight, even the wheels 66 could be eliminated with the panels sliding on a guide or rail. In addition, the tongue-in-groove engagement between adjoining side panels 20 could be modified considerably if so desired. Clearly, therefore, this invention should not be limited to the embodiment as illustrated in the drawings as a great number of variations could be devised without departing from the inventive concept.

Whether or not any support posts will be necessary will depend upon the over-all structure of the trailer, and particularly the roof 14. If the roof 14 is fabricated to be light in weight and yet rigid in form, such as having a truss-like structure, it may be that support posts will not be necessary.

What is claimed is:

1. A vehicular truck trailer or cargo area having removable side panels comprising a floor, a roof, a forward wall, two side walls and at least one door forming a rearward wall which can be opened to provide access to said floor and closed to completely enclose said floor, said floor having a floor track along at least one side thereof, said roof having at least one ceiling track along at least one side thereof positioned directly over and parallel to said floor track, and at least one of said side walls comprising at least one side panel engaged with said floor and ceiling tracks such that when said rear door is in an open position, said side wall panel can be moved rearwardly disengaging said side wall panel from said floor and ceiling tracks and removed from said truck trailer or cargo area, and such that said side wall panel can be reinserted to engage said floor and ceiling tracks and moved back into position to form said side wall and said rear door closed so that said side wall panel cannot then be removed.

2. A truck trailer or cargo area according to claim 1 in which said side wall panel is provided with means for sealing the edges thereof against adjacent components to provide at least a water tight seal.

3. A truck trailer or cargo area according to claim 1 in which said side wall panel is provided with a floor track guide along the bottom surface thereof for engaging said floor track and a ceiling track guide along the upper surface for engaging said ceiling track.

4. A truck trailer or cargo area according to claim 3 in which said floor track guide engages said floor track and said ceiling track guide engages said ceiling track such that said wall panel can only be removed by sliding said wall panel outwardly through the rear of said truck trailer or cargo area when said door is in an open position.

5. A truck trailer or cargo area according to claim 1 in which said side wall panel is provided with at least one wheel at the bottom thereof to facilitate its movement along said floor track.

6. A truck trailer or cargo area according to claim 1 in which said side wall panel is provided with a latch means to lock said side panel in place within said floor and ceiling tracks.

7. A truck trailer or cargo area according to claim 1 in which a plurality of such side wall panels are provided such that each side panel will tightly fit against the adjacent side panel to form said side wall.

8. A truck trailer or cargo area according to claim 7 in which said side wall panels are provided with means for sealing the edges thereof against adjacent wall panels and components to provide an air tight and water tight seal.

9. A truck trailer or cargo area according to claim 7 in which a plurality of such side wall panels are provided on each side thereof.

10. A truck trailer or cargo area according to claim 7 in which said side wall panels are provided with a floor track guide along the bottom surface thereof for engaging said floor track and a ceiling track guide along the upper surface for engaging said ceiling track.

11. A truck trailer or cargo area according to claim 10 in which said floor track guides engage said floor track and said ceiling track guides engage said ceiling track such that said wall panels can only be removed by sliding said wall panels outwardly through the rear of said truck trailer or cargo area when said door is in an open position.

12. A truck trailer or cargo area according to claim 7 in which the interfaces between each adjoining side wall panel is provided with a means for effecting an abutting relationship sufficient to provide an air and water tight seal at said interfaces.

13. A truck trailer or cargo area according to claim 12 in which said means for effecting an abutting relationship sufficient to provide at least a water tight seal at said interfaces is a tongue-in-groove relationship.

14. A truck trailer or cargo area according to claim 7 in which said side panel includes an outside wall board sufficient to shield said floor and ceiling tracks from water.

15. A truck trailer or cargo area according to claim 7 in which said side panel includes an inside wall board sufficient to provide a seal against said floor and ceiling tracks.

16. A truck trailer or cargo area according to claim 15 in which said inside wall board consists of pliable material that will be biased against said floor and ceiling tracks to form said seal.

17. A truck trailer or cargo area according to claim 16 in which said pliable material is rubber.

* * * * *